United States Patent [19]

Keeler et al.

[11] Patent Number: 5,102,485
[45] Date of Patent: Apr. 7, 1992

[54] APPARATUS FOR CONTINUOUS FEEDING AND SYNCHRONIZED APPLICATION OF FITMENTS TO CARTON BLANKS AND RELATED METHOD

[75] Inventors: Donald E. Keeler, Sussex; Edward Bombolevich, Ringwood, both of N.J.

[73] Assignee: International Paper Company, Purchase, N.Y.

[21] Appl. No.: 594,536

[22] Filed: Oct. 9, 1990

Related U.S. Application Data

[63] Continuation of Ser. No. 304,940, Feb. 1, 1989, abandoned.

[51] Int. Cl.⁵ .......................... B65C 1/02; B65C 9/18; B65C 9/32
[52] U.S. Cl. ........................ 156/256; 156/264; 156/521; 156/568; 156/DIG. 2; 156/DIG. 25; 156/DIG. 33; 156/DIG. 40
[58] Field of Search ............ 156/519, 521, 568, 517, 156/518, 520, 555, 556, 566, 567, 256, 264, 299, DIG. 2, DIG. 25, DIG. 33, DIG. 40; 493/212

[56] References Cited

U.S. PATENT DOCUMENTS

| | | | |
|---|---|---|---|
| 1,562,085 | 11/1925 | Foster | 156/568 |
| 2,258,611 | 10/1941 | Hothersall | 93/551 |
| 2,794,479 | 6/1957 | Ganz | 156/519 |
| 2,955,395 | 11/1960 | Aubry | 53/71 |
| 3,029,176 | 4/1962 | Schoonmaker | 156/362 |
| 3,029,569 | 4/1962 | Taylor | 53/14 |
| 3,052,588 | 9/1962 | Anderson | 156/252 |
| 3,586,585 | 6/1971 | Kirk et al. | 156/568 X |
| 3,835,756 | 9/1974 | Bosse | 156/519 X |
| 3,890,767 | 6/1975 | Cawrse | 53/296 |
| 3,901,758 | 8/1975 | Humphries | 156/555 X |
| 3,910,811 | 10/1975 | Paxton | 53/521 |
| 3,939,625 | 2/1976 | Remele | 53/131 |
| 3,957,570 | 5/1976 | Helm | 156/519 |
| 4,047,473 | 9/1977 | Fletcher | 93/36 B |
| 4,065,909 | 1/1978 | Mueller | 53/15 |
| 4,238,267 | 12/1980 | Konstantin | 156/380 |
| 4,250,686 | 2/1981 | Fujio | 53/296 |

OTHER PUBLICATIONS

Ferguson Machine Company, Ferguson Paradromic Indixing, 1974, Product Brochure.

Primary Examiner—Michael Wityshyn
Attorney, Agent, or Firm—Walt Thomas Zielinski

[57] ABSTRACT

An apparatus which coacts with a fitment supply station to effect continuous motion transfer and application of fitments to carton blanks on a conveyor line. The apparatus includes a rotatable drum having at least one vacuum transfer station disposed in rotational alignment between the fitment supply station and a conveyor release station, and an adjustable backup roll disposed in alignment with the drum and the release station for application of the fitments to cartons. A variable speed drive train matches drum and conveyor line speeds to effect continuous motion fitment transfer.

17 Claims, 7 Drawing Sheets

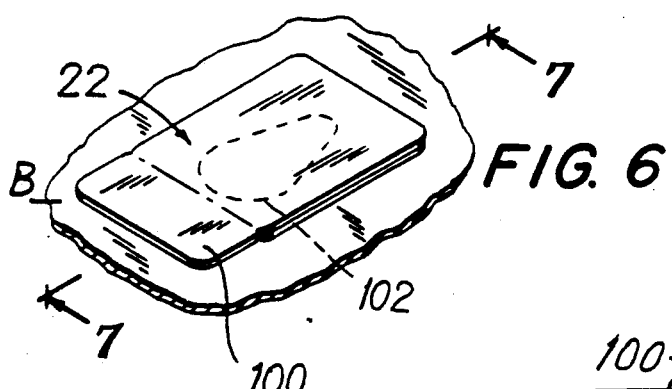
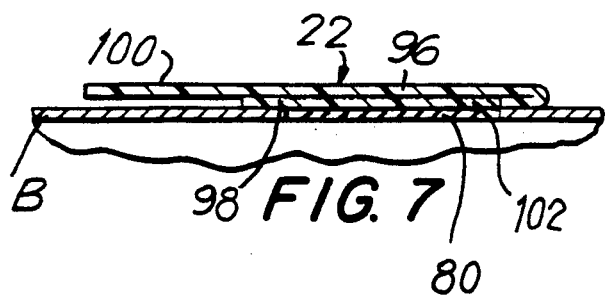
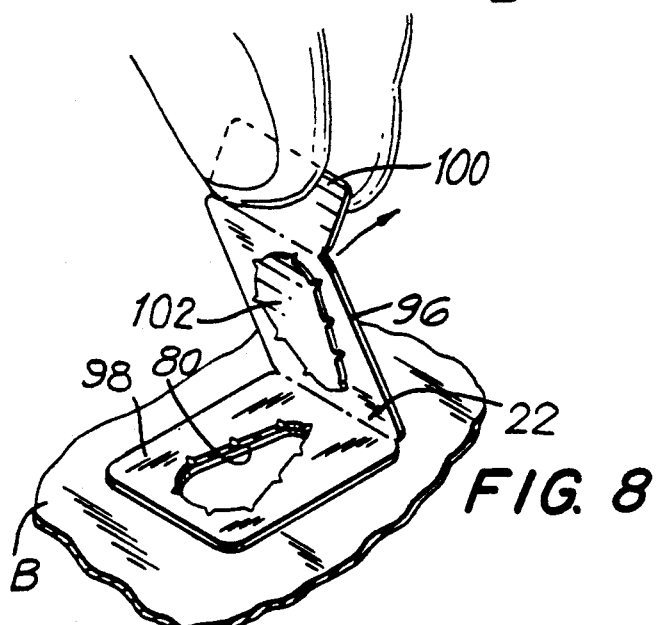
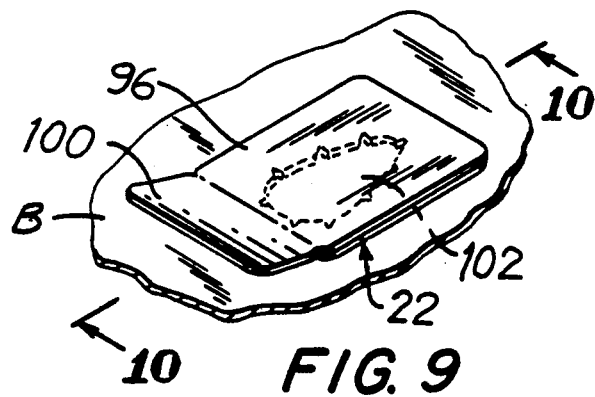
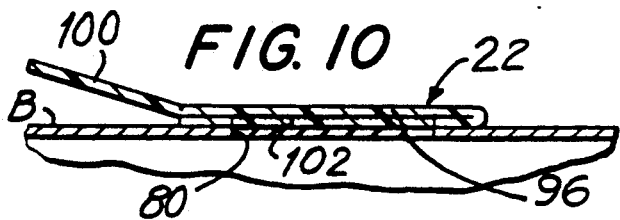

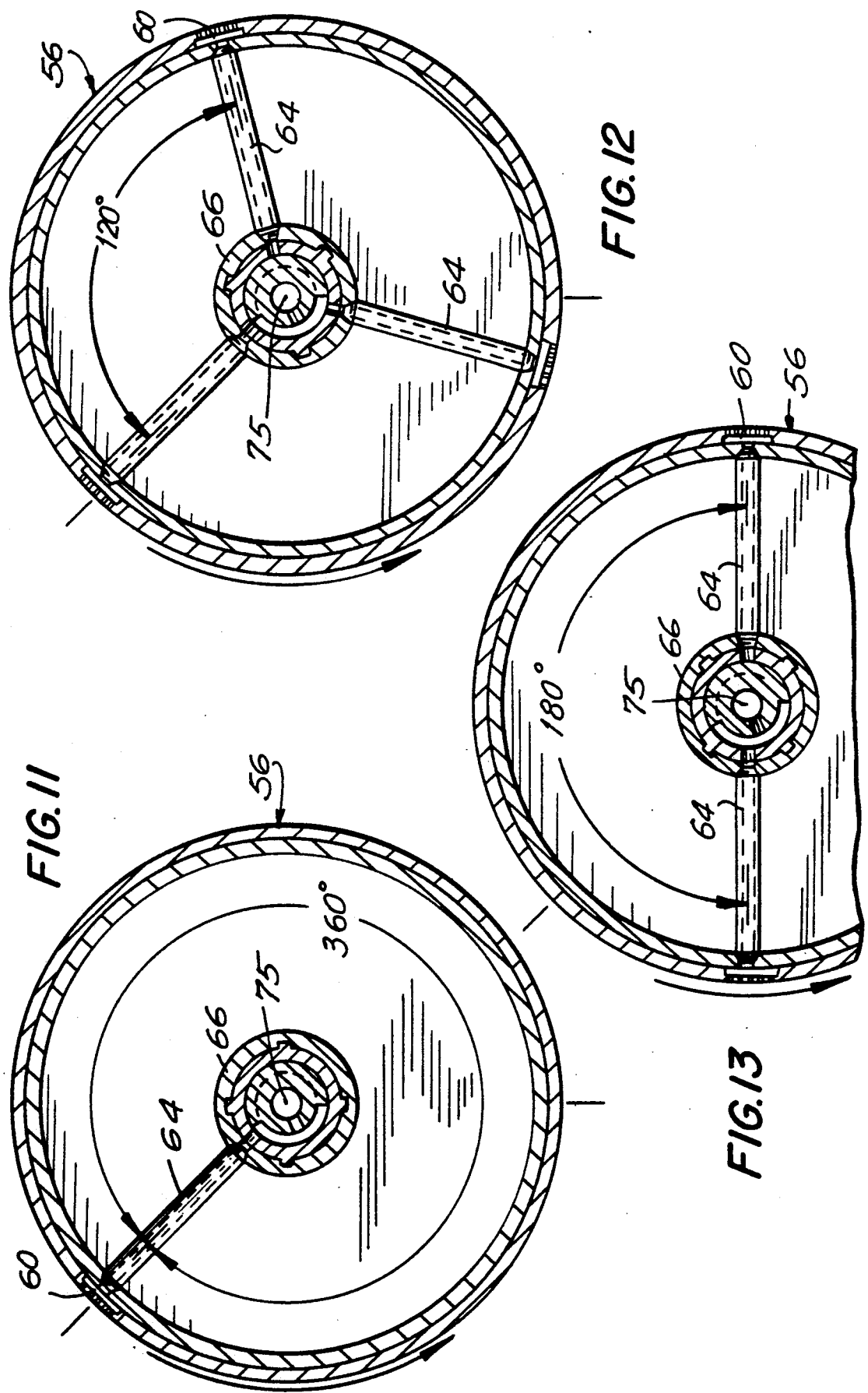

APPARATUS FOR CONTINUOUS FEEDING AND SYNCHRONIZED APPLICATION OF FITMENTS TO CARTON BLANKS AND RELATED METHOD

This is a continuation of co-pending application Ser. No. 07/304,990 filed on Feb. 1, 1989, now abandoned.

FIELD OF INVENTION

This application generally relates to an apparatus for continuous high speed application and sealing of die cut fitments, such as plastic carton pour spouts, to carton blanks on a continuous conveyor line. More particularly, it is concerned with an apparatus which synchronizes intermittent motion of a fitment transfer mechanism and continuous motion of carton blanks on a conveyor line. The apparatus effects precise registration and attachment of fitments to die cut openings in the carton blanks within tolerances of ±0.008 inches.

BACKGROUND ART

Conventional apparatus for attachment of closure fitments to containers and container blanks typically employ intermittent motion to interface fitment supply sources and container lines. Indexing mechanisms selectively advance carton and fitment sources into registration for intermittent and sequential attachment of cartons and fitments. Such intermittent motion machines have not proved satisfactory in that they do not accommodate high speed production. As representative of such art reference may be had to U.S. Pat. Nos. 3,890,767 to Carwrse; 3,029,176 to Schoonmaker; and 2,358,611 to Hothersall.

Another approach of the art is shown in U.S. Pat. No. 3,939,625 to Remele et al. which discloses a device for printing and feeding covers onto containers. The apparatus employs a horizontal carton conveyor which can be operated either continuously or intermittently. A continuous rotary cover print and supply line coacts with a pickup arm and turning mechanism to associate covers with containers on the conveyor line. Absent from this teaching is a mechanism for simultaneous application and pressure attachment of covers to cartons on the conveyor line. Remele employs further attachment mechanisms to effect cover to carton attachment.

There is accordingly a need in the art for high speed apparatus capable of interfacing a fitment supply source with a continuous carton blank conveyor line. Manufacturing efficiency requires apparatus having a capability of achieving direct and positive application of fitments in precise and aligned relation to carton blanks on a continuous motion carton conveyor.

International Paper Company, the assignee of the present application, has developed low profile plastic pour spout fitments which may be provided in a die cut web for application to carton blanks by heat sealing processes. Each fitment is configured to form a pour spout upon removal and attachment to a carton blank. Exemplary fitment configurations within the scope of this technology are shown in U.S. Pat. Nos. 4,705,197 and 4,770,325, both to Robert L. Gordon and Roderick W. Kalberer.

In the practice of this technology, it has been found effective to advance a fitment web through a fitment application machine which includes a continuous track, and fitment removal and sealing station. A bench type sealing apparatus including a carton mandrel and horn and conventional sealing apparatus are employed to apply fitments to carton blanks.

International Paper has also developed an indexing apparatus which effects precise registration of fitments in the die cut web with carton blanks. See U.S. patent application Ser. No. 165,647, (the "647 application") filed Mar. 8, 1988 to Donald E. Keeler, Edward Bombolevich, and Michael Sinocchi.

The present invention is directed to a high speed apparatus capable of interfacing an intermittently operated and indexed fitment line of the type disclosed in the '647 application, which is incorporated herein by reference, and a continuous carton blank conveyor line. The invention advance known fitment application apparatus by effecting direct and positive fitment to carton attachment within precise registration tolerances. It will be recognized that synchronization of intermittent fitment supply and carton conveyor lines will provide manufacturing efficiencies in high speed performance over known apparatus.

DISCLOSURE OF THE INVENTION

In the present invention, there is provided an apparatus for synchronized transfer of fitments from fitment supply to release stations for application to carton blanks on a continuous conveyor line which includes, a rotatable drum having a transfer station disposed in rotational alignment between the fitment supply and release stations, and coupling means for lodging a fitment in the transfer station for controlled transfer and application to a carton adhesion area. The apparatus also including pressure means for imparting positive engagement of the fitment to the adhesion area, and control means for rotating the drum at variable speeds to effect continuous synchronized and sequential transfer of fitments from the transfer station to carton blanks on the conveyor line.

In the preferred embodiment, the drum includes four transfer stations spaced 90° apart, and a central bore, and each transfer station includes an air pervious lodgement surface. The coupling means includes passageways connecting the bore and air pervious lodgment surfaces, and means for directing an air flow through the passageways to maintain fitments in contact with the drum. A preferred pressure means includes an adjustable backup roll disposed in alignment with the drum in a conveyor release station.

An indexing device coacts with a die cut fitment web and fitment dislodging device to provide the fitment supply. In accordance with the invention, the drum rotates intermittently to effect fitment transfer to cartons on the conveyor line at a constant velocity for continuous motion application. A radiant heat source and chill rolls are provided to effect hermetic heat seal of fitments to the cartons in-line.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 1A is a diagramatic illustration of a conventional indexing means employed in the apparatus to effect controlled rotation of a rotary vacuum drum;

FIG. 6 is a perspective view of a fitment in sealing relation to the carton blank, wherein the upper fitment section is fused to a removable die cut plug in the lower fitment section;

FIG. 7 is a cross-sectional view of the pour spout taken along the line 7—7 of FIG. 6;

FIGS. 8 and 9 show opening and reclosure features provided by the fitment pour spout structure illustrated in FIGS. 6 and 7

FIG. 10 is a cross-sectional view of the pour spout taken along the line 10—10 of FIG. 9;

FIGS. 11-15 are cross-sectional views of alternative vacuum transfer drums employed in the invention which respectively include one, two, three, five and six vacuum pick up stations.

BEST MODE OF CARRYING OUT THE INVENTION

Figure 1:
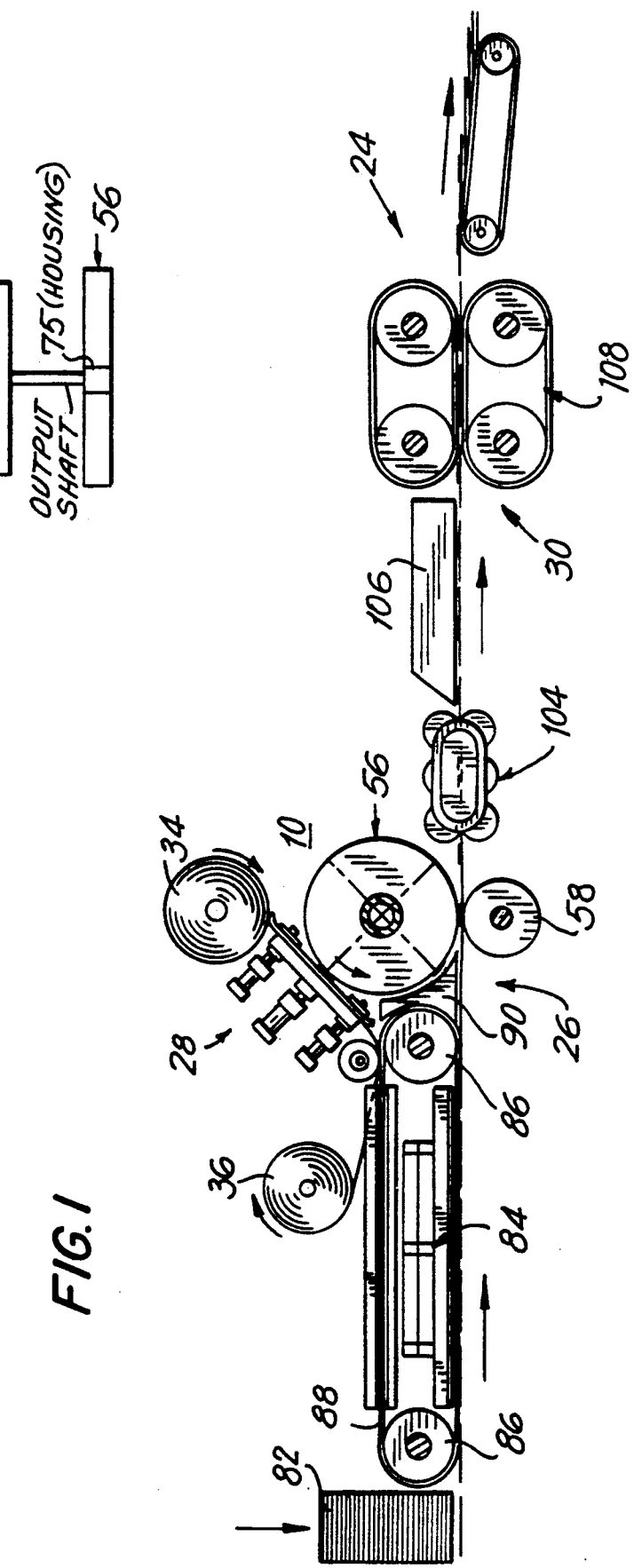
FIG. 1 is a side schematic view of an apparatus for synchronizd transfer and attachment of fitments from a die cut web to carton blanks in accordance with the invention shown in-line on a carton conveyor which includes fitment sealing mechanisms.

With reference to the drawings and in particular FIG. 1, there is shown a preferred embodiment of a continuous motion fitment adhering apparatus, generally designated 10, for attaching fitments 20 from a die cut web 22 to carton blanks B carried on a continuous motion conveyor line 24.

The apparatus 10 is situated in line with a carton blank supply station 26, a fitment supply station 28, and closure processing station 30. Prior to discussing the indexing apparatus, a brief description will be provided of the fitment supply station 28.

Figure 2:
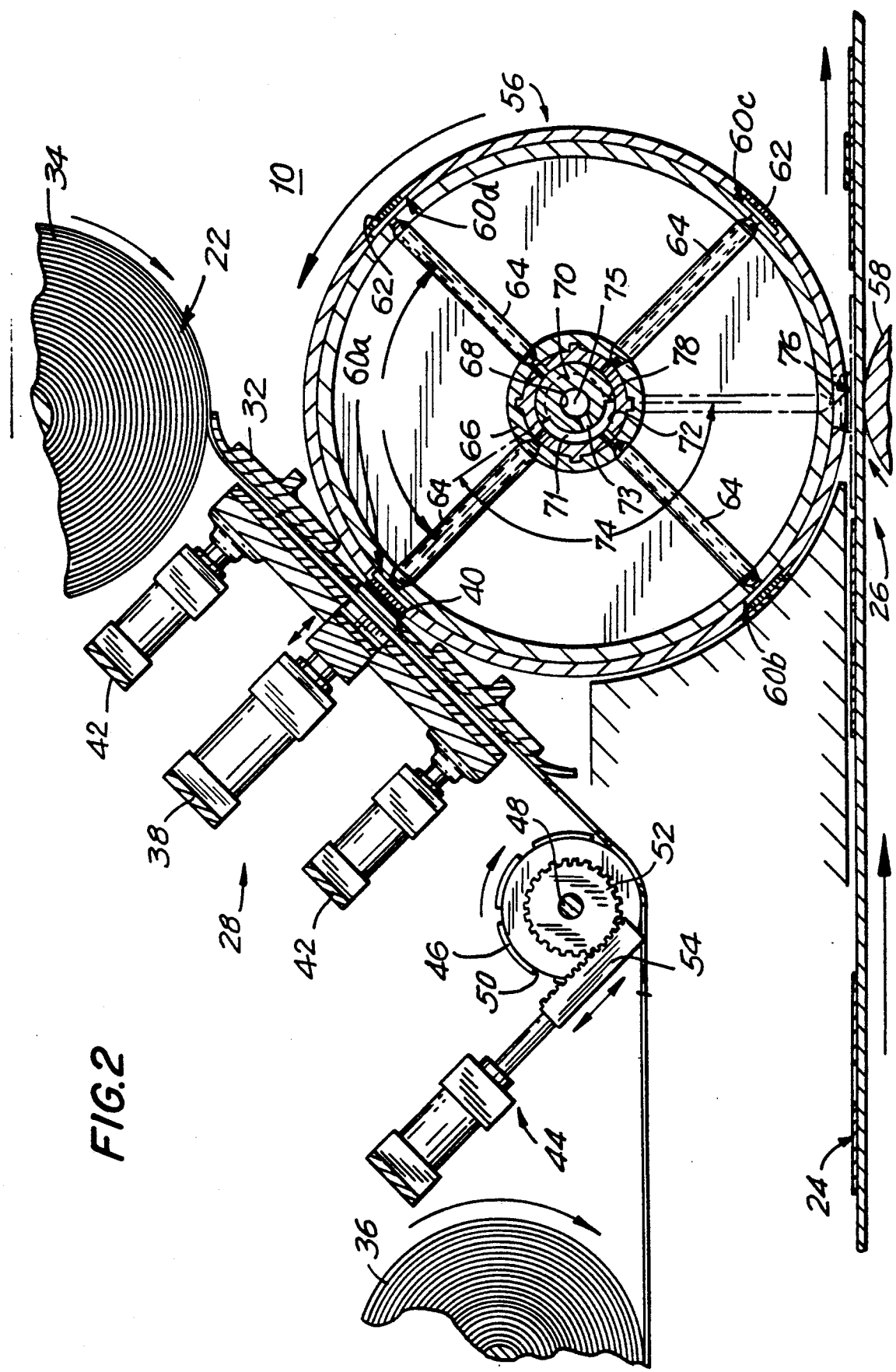
FIG. 2 is an enlarged cross-sectional view of the synchronized fitment transfer apparatus showing the manner in which the rotary vacuum drum is employed for pick up and transfer of fitments from the die cut web to carton blanks on the conveyor.

The carton fitment supply station 28 operates on the die cut fitment web 22, shown in FIG. 2, to sequentially supply fitments 20 to the adhering apparatus 10 for transfer and application to the carton blanks. The supply station 28 includes a carrier plate 32 which supports the fitment web for movement between unwind and intake reels 34, 36. A fitment breaking cylinder 38 disposed above the carrier plate 32 dislodges fitments from the web for release through a discharge slot 40 in the carrier plate. Dual action web clamping cylinders 42 are positioned at upstream and downstream locations relative to the slot 40 to secure the web in stretch position for fitment dislodgement.

In the preferred embodiment, the supply station 28 coacts with an indexing apparatus 44 which intermittently advances the fitment web 22 to precisely align die cut fitments with the discharge slot 40 for timed movement of the breaking cylinder 38 and discharge of fitments.

The indexing apparatus is of the type disclosed in pending U.S. Pat. No. 4,846,915 to Donald E. Keeler, Edward Bombolevich, and Michael Sinocchi, assigned to International Paper Company, which is incorporated herein by reference. The apparatus includes an indexing wheel 46 rotatably mounted on an indexing shaft 48. The indexing wheel 46 includes a plurality of circumferentially spaced axial indentations or sprockets 50 on its periphery which are configured to engage void areas (not shown) in the web provided by dislodgement of fitments. Precision indexing of the web is obtained by action of a gear wheel 52 which is coupled to the indexing shaft 48 and a reciprocating rack 54 and aligning mechanisms described in the prior application.

Mechanism of the Fitment Adhering Apparatus

FIG. 2 is a cross-sectional view of the adhering apparatus 10 illustrating the coaction of the fitment supply station 28 and the continuous carton conveyor line 24. The apparatus 10 includes a rotatable transfer drum 56 and an adjustable backup roll 58 disposed in alignment with the drum and conveyor line 24.

The transfer drum 56 preferably includes first, second, third and fourth transfer stations 60 ($a, b, c, d$) which are respectively spaced 90° apart on the periphery of the drum. Each transfer station 60 includes an air pervious lodgement surface 62 which is coupled by passageways or tubes 64 to a bearing 66 which rotates relative to a central stationary vacuum bore 68 formed in a sleeve 70. Sleeve 70 is disposed within a bore 72 in the bearing and includes a circumferential vacuum slot 71 which communicates with the passageways 64 within a transfer arc 74 and a radial passageway 73 which communicates with slot 71 and bore 68. Fitments are held by vacuum pressure in the transfer stations 60 during rotation of the drum through arc 74 to transfer fitments 20 between the fitment supply and release stations 28, 76.

In operation, a first transfer station 60a is aligned in a stopped drum position with the fitment supply station 28 to lodge a fitment 20 in frictional contact with the air pervious surface 62. After lodgement, rotation of the drum 56 carries the fitment into tangential contact with one of a series of moving carton blanks which advance through the fitment release and adhesion station 76 on the conveyor line 24. Fitments are released by a vacuum cut-off 78 in slot 72 which is aligned with the adhesion station 76. See FIG. 2.

In accordance with the invention, a control means is provided which effects rotation of the drum 56 at variable speeds for synchronized transfer and adhesion of fitments to carton blanks. In the preferred embodiment, cartons on the conveyor line are advanced at a constant velocity for continuous fitment carton application. Synchronization of the drum and line is achieved by stopping rotation of the drum for lodgement of fitments in the transfer stations 60 and then accelerating the drum 56 to match its speed with the carton line. Synchronized fitment transfer can also be effected without stopping drum rotation by matching drum rotation speed with fitments at the fitment supply and release stations 28, 76.

The control means may be provided by a conventional indexing drive, shown in diagrammatic format in FIG. 1A, of the type offered by Ferguson Machine Company, St. Louis, Mo. under the brand designation "Para Dex" No. FD 200, Model FII. Ferguson's "Para Dex" drive employs a conjugate cam index configuration which is capable of transforming a continuous input drive into motion having controlled velocity, acceleration, and deceleration characteristics. The "Para Dex" drive includes an output shaft which is coupled to shaft housing 75 in drum 56 of the fitment adhering apparatus 10. Disclosure concerning this technology is set forth in U.S. Pat. No. 3,572,173.

"Para Dex" drives can accommodate alternative embodiments of the invention illustrated in FIGS. 2 and 11-14 which employ one to six transfer stations 60 circumferentially spaced on the drum at intervals of 360, 180, 120, 90, 72 and 60 degrees. It will be recognized that the number of transfer stations 60 and consequently, fitments per revolution of the drum transfered to the carton line, is a function of line speed and related material process conditions.

Figure 16:
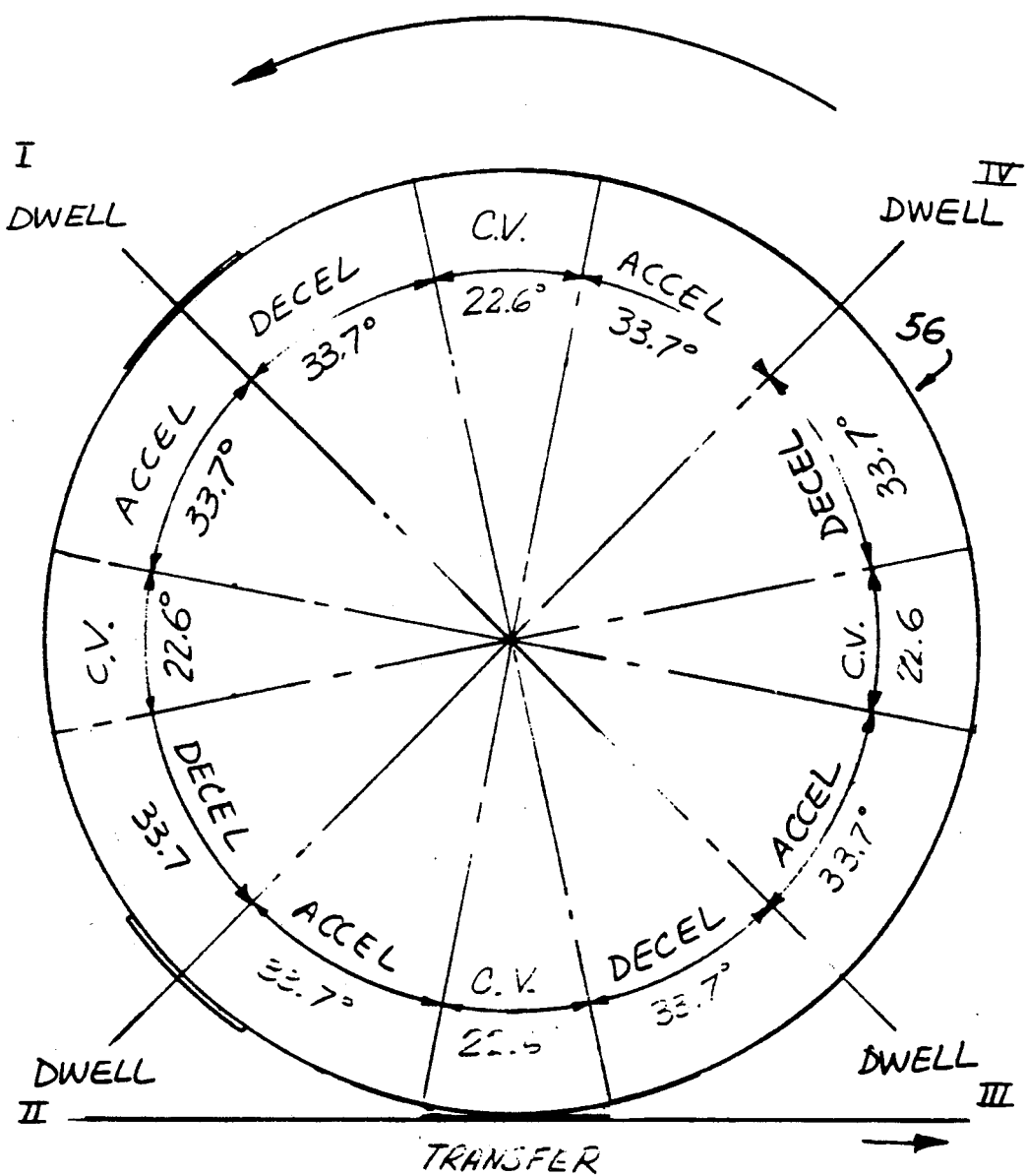
FIG. 16 is a schematic illustration of the rotary drum employed in the embodiment of FIG. 2 showing velocity variations in rotation of the drum through 360 degrees.

A preferred arrangement is illustrated in FIGS. 2 and 16 in which the drum 56 is provided with four transfer stations 60a,b,c,d which are spaced at 90 degree intervals. In operation, the drum, in a stopped position or at a velocity which matches the fitment release speed, receives a fitment in transfer station 60a and then accelerates, preferably within an arc of approximately 33.7 degrees, to conveyor line speed. At 90 degrees of rotation the drum again stops or decelerates to fitment release speed to receive a fitment in the second transfer station 60b. Thereafter, the drum is advanced through a further 45 degree arc at controlled velocity for synchronized transfer of a fitment in release station 76 to a carton fitment adhesion area 80. At the instant of attachment between the fitment and the blank, the velocity of the drum and conveyor are equal and, accordingly, there is no relative motion therebetween. Alignment between the fitment and carton adhesion area of the invention are within tolerances of ±0.008 inch. Repetition of this cycle at successive transfer stations on the drum effects continuous feeding and application of fitments to carton blanks on the line.

FIG. 16 illustrates the variation in velocity of the drum through 360 degrees of rotation in the four station set-up. In each 90 degree interval, the transfer station is accelerated to line speed through an angular displacement of 33.7 degrees, maintained at a constant velocity through 22.6 degrees of rotation, and then decelerated through 33.7 degrees to match line velocity for fitment release. In this preferred set-up, the drum diameter and circumference are 20.37178 and 64 inches, respectively. The "Para Dex" control means receives a drive shaft input of one revolution for each 90 degree index interval on the drum. A preferred drum dwell period at the fitment supply station for loading of fitments is 0.100 second. The "Para Dex" control means achieves optimum performance of 100 indexes — fitment to carton blank attachments — per minute at conveyor line speeds of 133 feet/minute.

Adhesion of fitments to the carton blanks is obtained by heat seal attachment. Carton blanks which include a heat sealable material coating, such as polyethylene, are fed from a magazine 82 for passage on the line through a conventional radiant heat station 84. Rollers 86, driven by a belt 88, adjacent opposing ends of the radiant heater, sequentially direct the blanks to the fitment release station 76. The fitments 20, which are fabricated of a heat sealable material, such as a high density polyetheylene, are heated by an auxiliary heater 90 while lodged in the transfer stations 60 prior to release.

At the release station 76, the backup roller 58, which preferably has a resilient rubber covering, is adjustably positioned relative to the drum 56 to define a pressure nip for passage of blanks between the drum and roller. Sufficient pressure is applied to fitments and cartons passing through the nip to obtain hermetic fitment seals to adhesion areas 80 on the carton blanks.

Figure 3:
FIG. 3 is a plan view of a segment of the die cut fitment web.

Attention is now directed to the closure processing station 30 which includes fitment alignment mechanisms. For purposes of explanation attention is directed to FIG. 3 which illustrates a segment of the fitment web 22. Each fitment 20 includes an upper section 96, a hinged lower section 98 which includes a die cut plug 102, and a tamper evidence flap 100 which is secured to the upper section. The lower section 98 is attached to the carton blank at the release station 76, aligning the plug 102 with a corresponding die cut in the carton blank. See FIGS. 4 and 5. Following attachment the blank is advanced through chill rolls 104 which cool the fitment and blank to cure the heat seal attachment and permit further fitment processing.

Figure 4:
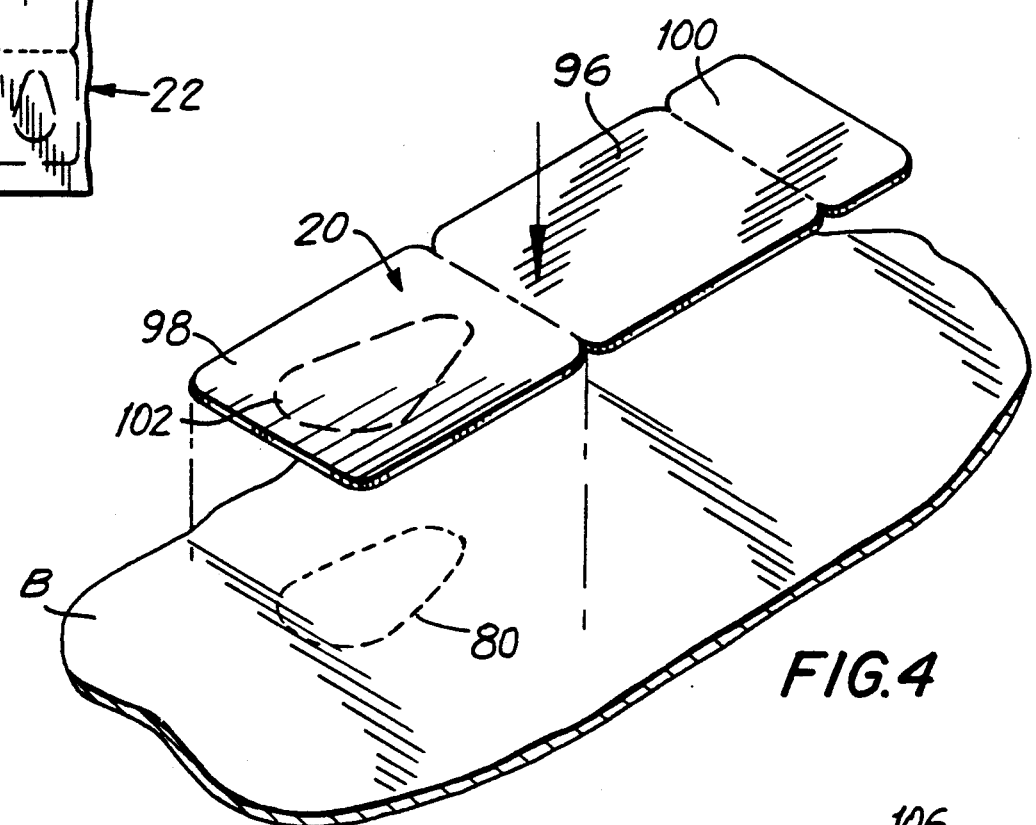
FIG. 4 is a perspective view of a fitment in relation to a carton blank, illustrating the manner in which the fitment is positioned in alignment with a carton die cut opening for attachment.
Figure 5:
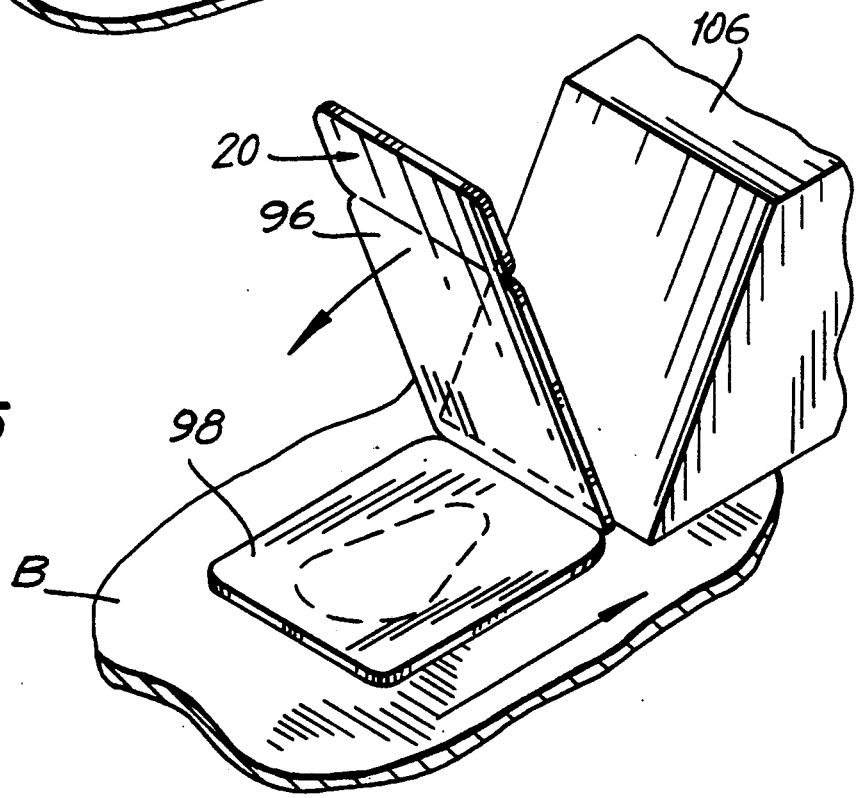
FIG. 5 is a perspective view of a fitment following its attachment to the carton blank showing the manner in which a plow is utilized to fold an upper fitment section into overlying arrangement relative to a lower fitment section.
Figure 15:
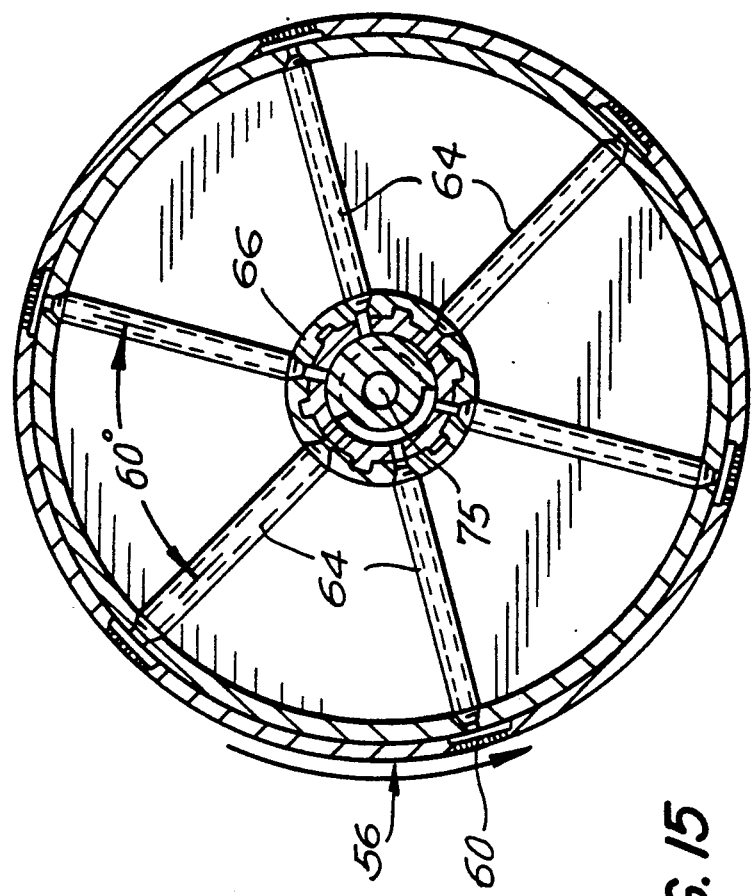
Figure 14:
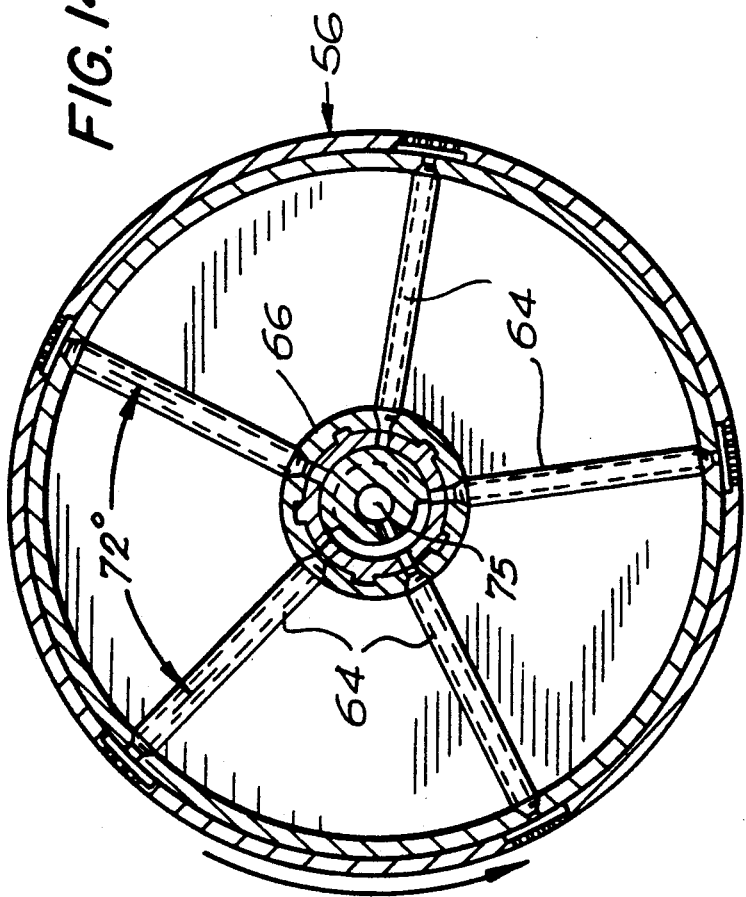

A plow 106, best shown in FIGS. 1 and 4, folds the upper fitment section 96 to overlie the lower section 98. Heat sealing rollers 108 thereafter fuse the upper section 96 to the die cut plug 102 and tamper evidence flap 100 to the carton to complete processing of the closure fitment. See FIGS. 6 and 7. The manner in which the fitment functions is illustrated in FIGS. 8-10. Lifting of the upper section 96 ruptures the removable plug, and die cut in the carton to provide a reclosable dispensing opening.

Advantage is obtained in the invention by synchronizing intermittent motion of the transfer drum 56 with a constant velocity carton conveyor line. Such synchronization permits continuous production line attachment of fitments to carton blanks for manufacturing efficiencies.

It will be recognized that numerous modifications are possible in light of the above disclosure. For example, although specifications have been set forth for the drum and relative speeds of the drum and carton line, the invention may employ other operating parameters. Similarily, the fitments employed in the apparatus are merely illustrative of a diversity of fitment types for which the invention has application.

Therefore, although the invention has been described with reference to certain preferred embodiments, it will be appreciated that other indexing apparatus may be devised, which are nevertheless within the scope and spirit of the invention as defined by the claims appended hereto.

We claim:

1. A method for synchronized transfer of fitments from a fitment supply station to a fitment adhesion area on a carton blank carried on a continuous conveyor line, comprising the steps of:

providing a rotatable drum having a first transfer station for receiving a fitment from the fitment supply station and having an air pervious lodgement surface located at said first transfer station;

holding the fitment at said first transfer station by applying vacuum pressure through said air pervious lodgement surface during rotation of said drum between a first rotational position at which said first transfer station opposes said fitment supply station and a second rotational position displaced from said first rotational position by a predetermined angle;

rotating said drum from said first rotational position to said second rotational position to effect transfer of said fitment from said fitment supply station to a position adjacent said fitment adhesion area on said carton blank carried on said conveyor line; and applying pressure to the fitment when said fitment is adjacent to said fitment adhesion area to effect fitment attachment to the fitment adhesion area;

wherein said vacuum pressure is applied to said air pervious lodgement surface through a stationary sleeve having an axial passageway, a radial passageway which communicates with said axial passageway and a circumferential slot which communicates with said radial passageway, said circumferential slot being formed on an outer circumferential surface of said stationary sleeve; a bearing rotatably mounted on said sleeve and having a radial passageway which communicates with said circumferential slot when said drum is in said first rotational position and during rotation of said drum from said first rotational position to said second rotational position; and a first tube having one end connected to said hearing and another end connected to said drum, said first tube having a passageway which communicates with said radial passageway of said bearing at said one end of said first tube and which communicates with said air pervious lodgement surface of said drum at said another end of said first tube.

2. The method of claim 1, wherein said roatatable drum stops intermittently each time a transfer station is in alignment with the fitment supply station to receive a fitment, said conveyor line advances carton blanks at a continuous constant velocity, and said rotatable drum is accelerated following each lodgement of a fitment in a transfer station such that the tangential speed of said transfer station becomes equal to the conveyor line speed, so that there is no relative motion between the fitment in said transfer station and the fitment adhesion area on said carton blank upon release and application of said fitment on said fitment adhesion area.

3. The method of claim 1, wherein the step of applying pressure to the fitments includes provision of an adjustable backup roll opposed to said rotatable drum, said backup roll and drum coacting to apply pressure to the fitment.

4. The method of claim 1, wherein said rotatable drum includes two transfer stations spaced 180° apart on the circumference of said rotatable drum.

5. The method of claim 1, wherein said rotatable drum includes four transfer stations spaced 90° apart on the circumference of said rotatable drum.

6. An apparatus for synchronized transfer of fitments from a fitment supply station to a fitment adhesion area on a carton blank carried on a continuous conveyor line, comprising:

a rotatable drum having a first transfer station for receiving a fitment from the fitment supply station and having an air pervious lodgement surface located at said first transfer station;

pressure means for application of pressure to the fitment to effect fitment attachment to the fitment adhesion area;

vacuum pressure means for holding the fitment at said first transfer station during rotation of said drum between a first rotational position at which said first transfer station opposes said fitment supply station and a second rotational position at which said first transfer station opposes said pressure means; and control means for rotating said drum to effect continuous synchronized transfer of fitments from said fitment supply station to a position between said drum and said pressure means, wherein said vacuum pressure means comprises a stationary sleeve having an axial passageway, a radial passageway which communicates with said axial passageway and a circumferential slot which communicates with said radial passageway, said circumferential slot being formed on an outer circumferential surface of said stationary sleeve; a bearing rotatably mounted on said sleeve and having a radial passageway which communicates with said circumferential slot when said drum is in said first rotational position and during rotation of said drum from said first rotational position to said second rotational position, and a first tube having one end connected to said bearing and another end connected to said drum, said first tube having a passageway which communicates with said radial passageway of said bearing at said one end of said first tube and which communicates with said air pervious lodgement surface of said drum at said another end of said first tube.

7. An apparatus as set forth in claim 6, wherein said rotatable drum stops intermittently at a position in which said first transfer station is in alignment with the fitment supply station to receive a fitment, said conveyor line advances carton blanks at a continuous constant velocity, and said control means effects drum acceleration following lodgement of the fitment at said first transfer station such that the tangential speed of said first transfer station becomes equal to the conveyor line speed, so that there is no relative motion between the fitment at said first transfer station and the fitment adhesion area on said carton blank upon release and application of said fitment on said fitment adhesion area.

8. An apparatus as set forth in claim 6, wherein said pressure means includes an adjustable backup roll opposed to said rotatable drum, said backup roll and drum coacting to apply pressure to the fitment.

9. An apparatus as set forth in claim 6, wherein said rotatable drum includes a second transfer station, said first and second transfer stations being spaced 180° apart on the circumference of said rotatable drum.

10. An apparatus as set forth in claim 6, wherein said rotatable drum includes second and third transfer stations, said first through third transfer stations being spaced 120° apart on the circumference of said rotatable drum.

11. An apparatus as set forth in claim 6, wherein said rotatable drum includes second, third, fourth and fifth transfer stations, said first through fifth transfer stations being spaced 72° apart on the circumference of said rotatable drum.

12. An apparatus as set forth in claim 6, wherein said rotatable drum includes second, third, fourth, fifth and sixth transfer stations, said first through sixth transfer stations being spaced 60° apart on the circumference of said rotatable drum.

13. An apparatus as set forth in claim 6, wherein the fitments are applied to the fitment adhesion areas within tolerance of ±0.008 inch.

14. An apparatus as set forth in claim 6, wherein said rotatable drum includes second, third and fourth transfer stations, said first through fourth transfer stations being spaced 90° apart on the circumference of said rotatable drum.

15. An apparatus as set forth in claim 14, wherein said fitment supply station and pressure means are offset 135° relative to the drum, and said control means sequentially accelerates each transfer station to conveyor line speed following fitment lodgement within approximately 33.7° of drum rotation, maintains each station at conveyor line speed through approximately 22.6° of drum rotation, and thereafter decelerates through approximately 33.7° of drum rotation, such that the tangential speed of each transfer station matches said conveyor line speed at said pressure means for continuous attachment of fitments to carton blanks.

16. An apparatus as set forth in claim 15, wherein said pressure means includes an adjustable backup roll opposed to said rotatable drum, said backup roll and drum coacting to apply pressure to the fitment.

17. An apparatus as set forth in claim 16, wherein said backup roller includes an outer resilient cover material to facilitate application of the fitments to carton blanks with a specified pressure.

* * * * *